United States Patent
Chang

(10) Patent No.: US 6,618,912 B1
(45) Date of Patent: Sep. 16, 2003

(54) POSITIONING DEVICE OF FREIGHT ROPE FIXTURE

(76) Inventor: Vincent Chang, 58, Ma Yuan West St., Taichung (TW)

(*) Notice: Subject to any disclaimer, the term of this patent is extended or adjusted under 35 U.S.C. 154(b) by 0 days.

(21) Appl. No.: 10/195,506

(22) Filed: Jul. 12, 2002

(51) Int. Cl.[7] ................................................. B60P 7/08
(52) U.S. Cl. ........................ 24/498; 24/302; 24/265 CD
(58) Field of Search ...................... 410/116; 24/265 CD, 24/68 CD, 300–302, 498, 509–511, 599.6–599.8

(56) References Cited

U.S. PATENT DOCUMENTS

| | | | | |
|---|---|---|---|---|
| 1,275,582 A | * | 8/1918 | Mascellino | 24/338 |
| 2,655,874 A | * | 11/1953 | Swann | 410/106 |
| 2,866,248 A | * | 12/1958 | Reno | 410/106 |
| 4,928,360 A | * | 5/1990 | Wilbanks | 24/599.8 |
| 5,416,956 A | * | 5/1995 | Rubin | 24/601 |
| 5,443,341 A | * | 8/1995 | Hamilton | 410/116 |
| 5,553,981 A | * | 9/1996 | Braden | 410/116 |
| 5,836,060 A | * | 11/1998 | Profit | 24/698.2 |
| 5,983,573 A | * | 11/1999 | MacKarvich | 52/23 |
| 6,168,360 B1 | * | 1/2001 | Knox | 410/96 |
| 6,418,685 B1 | * | 7/2002 | Oliver et al. | 52/293.3 |

FOREIGN PATENT DOCUMENTS

JP          11044348 A   *  2/1999  ........... F16G/11/12

* cited by examiner

Primary Examiner—James R. Brittain

(57) ABSTRACT

A positioning device of a freight rope fixture includes a metallic plate, an urging seat, a torsion spring, and an insertion pin. The urging seat is pivotally mounted between the two opposite wings of the metallic plate and has a first end formed with an urging portion, and a second end formed with a press portion. The torsion spring may force the urging portion of the urging seat to rest on the bent hook portion of the metallic plate. Thus, the torsion spring may force the urging portion of the urging seat to rest on the side plate of the freight truck, thereby achieving a previous locking and positioning effect, so that the rope may be used to bind the freight easily.

13 Claims, 14 Drawing Sheets

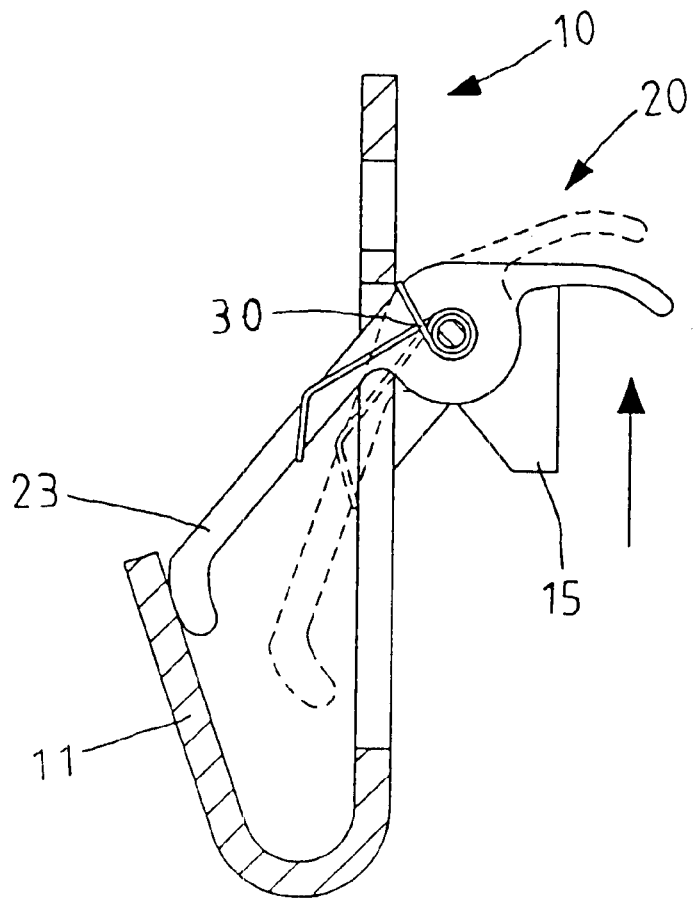
F I G. 4

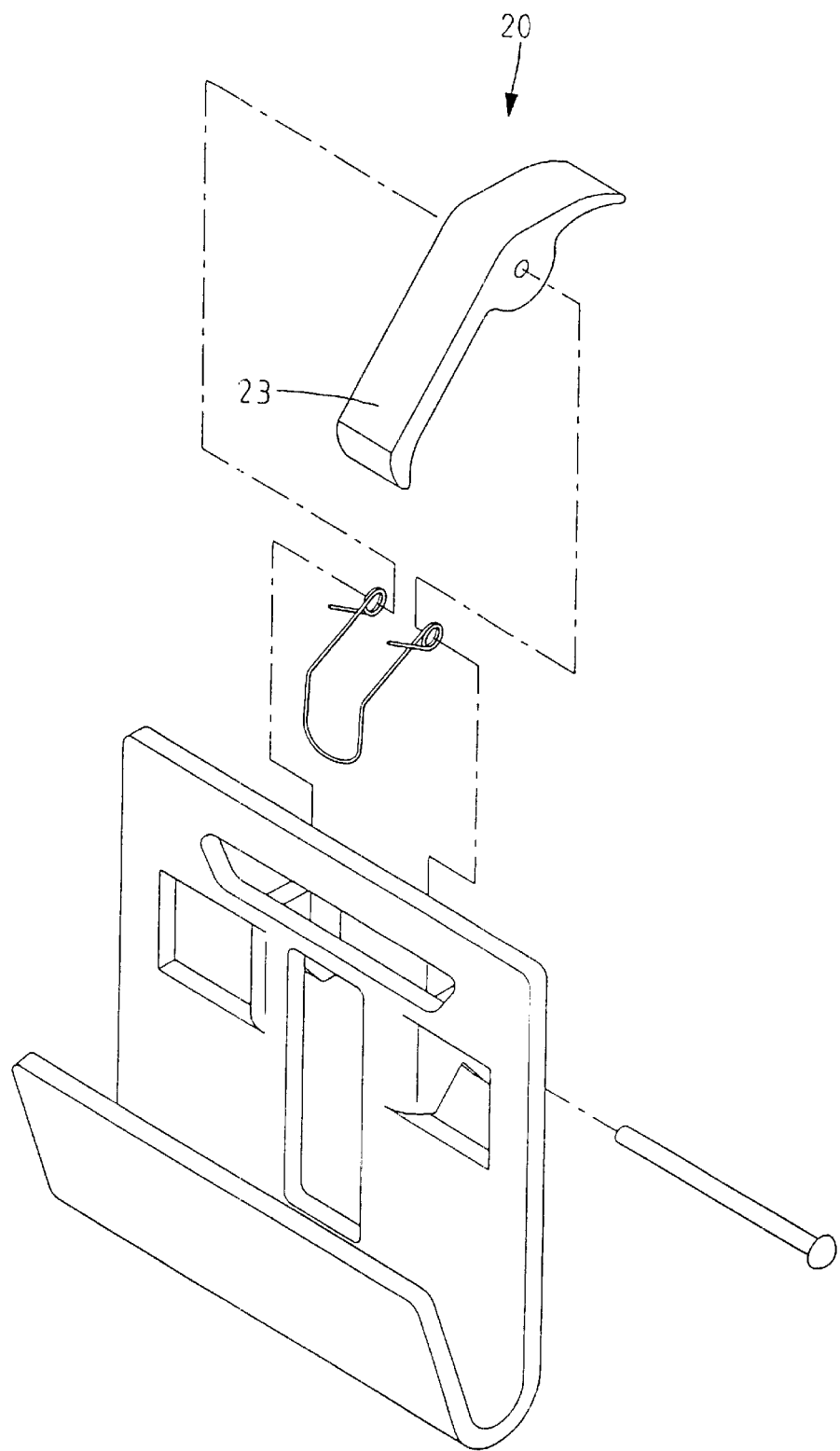
F I G. 8

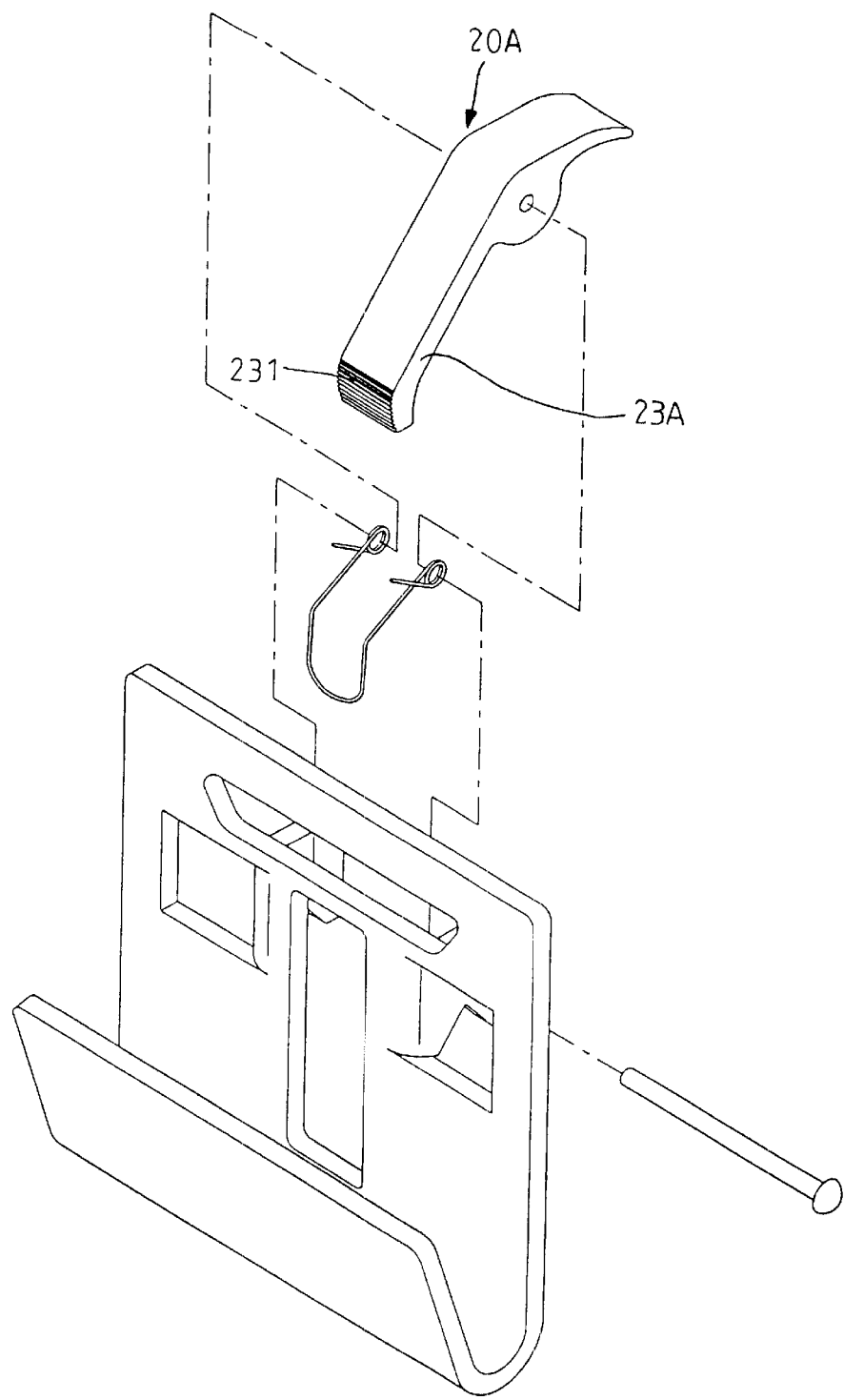
F I G. 9

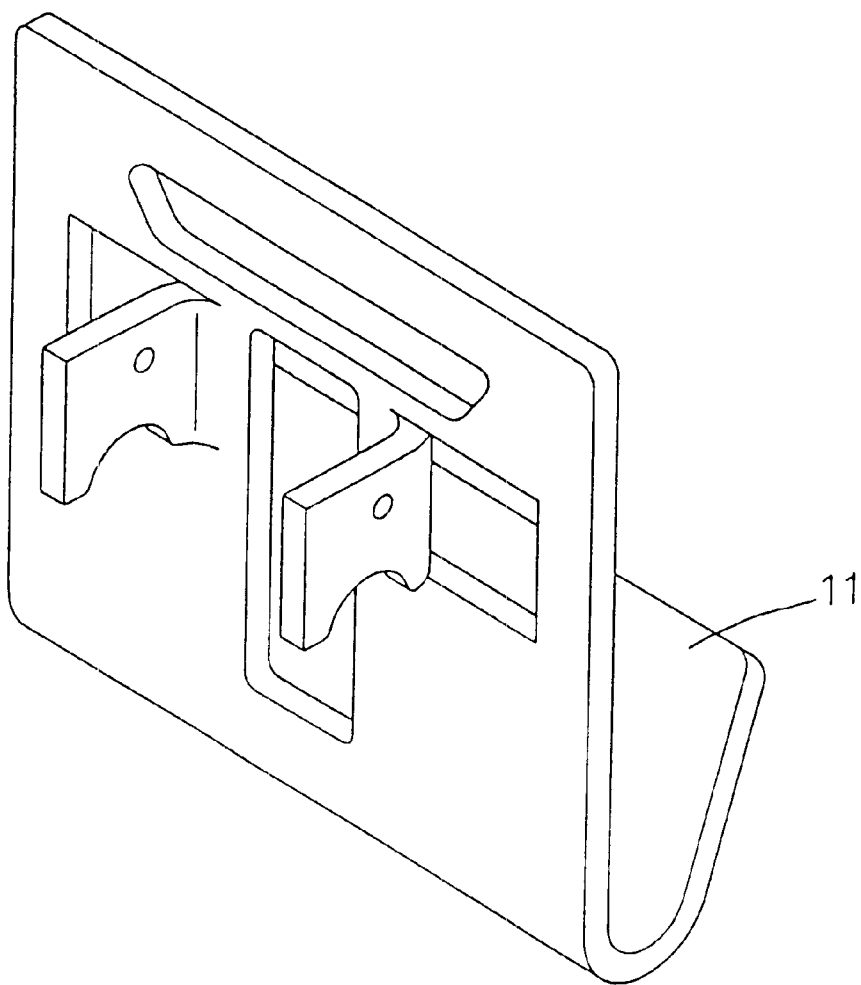
F I G. 11

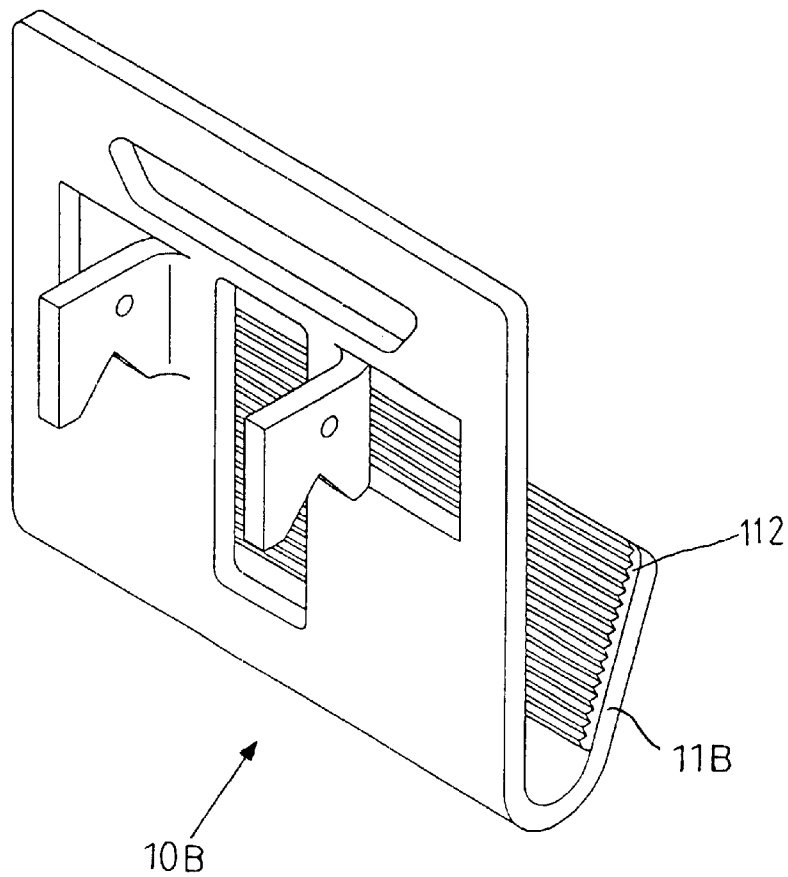
F I G. 13

POSITIONING DEVICE OF FREIGHT ROPE FIXTURE

BACKGROUND OF THE INVENTION

1. Field of the Invention

The present invention relates to a positioning device of a freight rope fixture, and more particularly to a positioning device of a freight rope fixture, wherein the urging portion of the urging seat may be urged on and detached from the bent hook portion of the metallic plate easily and rapidly, so that the positioning device of the freight rope fixture may be operated easily and conveniently.

2. Description of the Related Art

A conventional plate-type hanging hook is available for a freight truck to fix the freight on the truck. However, the conventional plate-type hanging hook has the following disadvantages.

1. The freight cannot be bound on the truck by one worker, so that at least two workers are needed to accomplish the binding work, thereby greatly consuming time and manual work.

2. The freight cannot be bound by the conventional plate-type hanging hook rigidly and stably, so that the freight easily falls out of the truck during the process of transportation, thereby causing a danger or an accident.

3. The conventional plate-type hanging hook cannot be loosened from the rope easily, so that the freight cannot be detached from the rope easily, thereby greatly consuming time and manual work.

SUMMARY OF THE INVENTION

The primary objective of the present invention is to provide a positioning device of a freight rope fixture, wherein the torsion spring may force the urging portion of the urging seat to rest on the bent hook portion of the metallic plate. Thus, the torsion spring may force the urging portion of the urging seat to rest on the side plate of the freight truck, thereby providing an urging effect on the side plate of the freight truck, so that the side plate of the freight truck may be positioned rigidly and stably, and the rope may be used to bind the freight easily.

Another objective of the present invention is to provide a positioning device of a freight rope fixture, wherein the press portion of the urging seat may be pressed upward, so that the urging seat may be pivoted about the insertion pin, thereby moving and detaching the urging portion of the urging seat from the bent hook portion of the metallic plate easily and rapidly.

In accordance with the present invention, there is provided a positioning device of a freight rope fixture, comprising:

a metallic plate, an urging seat, a torsion spring, and an insertion pin, wherein:

the metallic plate is formed with a bent hook portion, the metallic plate has two sides formed with two opposite rectangular slots, the metallic plate is integrally formed with two opposite wings through the two opposite rectangular slots by a punching process, each of the two opposite wings of the metallic plate is formed with a through hole, the metallic plate has a mediate section formed with a rectangular retaining slot located between the two opposite rectangular slots;

the urging seat is pivotally mounted between the two opposite wings of the metallic plate and has a first end formed with an urging portion, and a second end formed with a press portion;

the torsion spring is urged between the metallic plate and the urging portion of the urging seat; and the insertion pin is in turn extended through the through hole of each of the two opposite wings of the metallic plate, the urging seat, and the torsion spring.

Further benefits and advantages of the present invention will become apparent after a careful reading of the detailed description with appropriate reference to the accompanying drawings.

BRIEF DESCRIPTION OF THE DRAWINGS

FIG. 4 is a side plan cross-sectional view of the positioning device of a freight rope fixture as shown in FIG. 3;

FIG. 8 is a perspective view of an urging seat of the positioning device of a freight rope fixture in accordance with the preferred embodiment of the present invention;

FIG. 9 is a perspective view of an urging seat of the positioning device of a freight rope fixture in accordance with another embodiment of the present invention;

FIG. 11 is a perspective view of a metallic plate of the positioning device of a freight rope fixture in accordance with the preferred embodiment of the present invention;

FIG. 13 is a perspective view of a metallic plate of the positioning device of a freight rope fixture in accordance with another embodiment of the present invention.

DETAILED DESCRIPTION OF THE INVENTION

Figure 1:
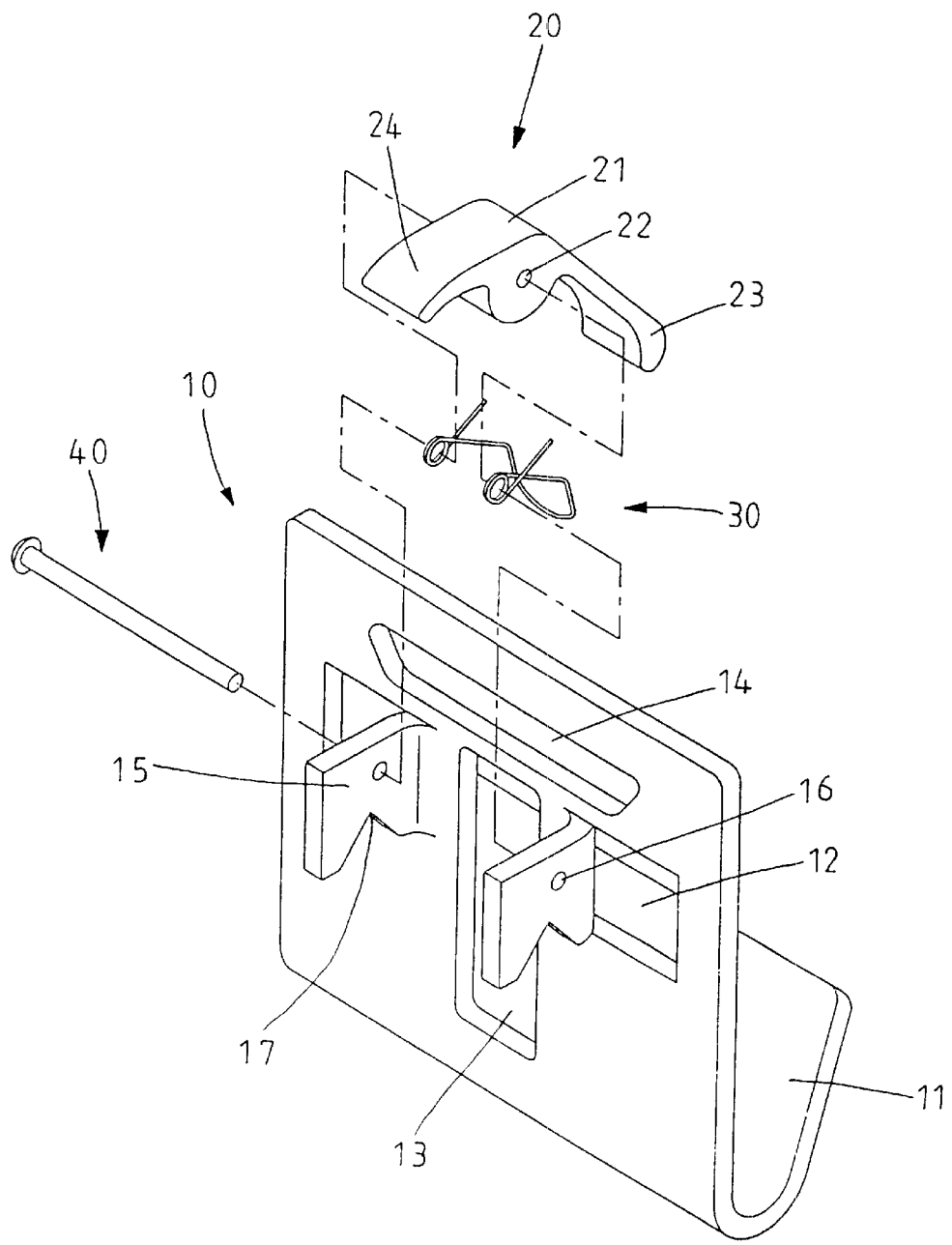
FIG. 1 is an exploded perspective view of a positioning device of a freight rope fixture in accordance with a preferred embodiment of the present invention.
Figure 2:
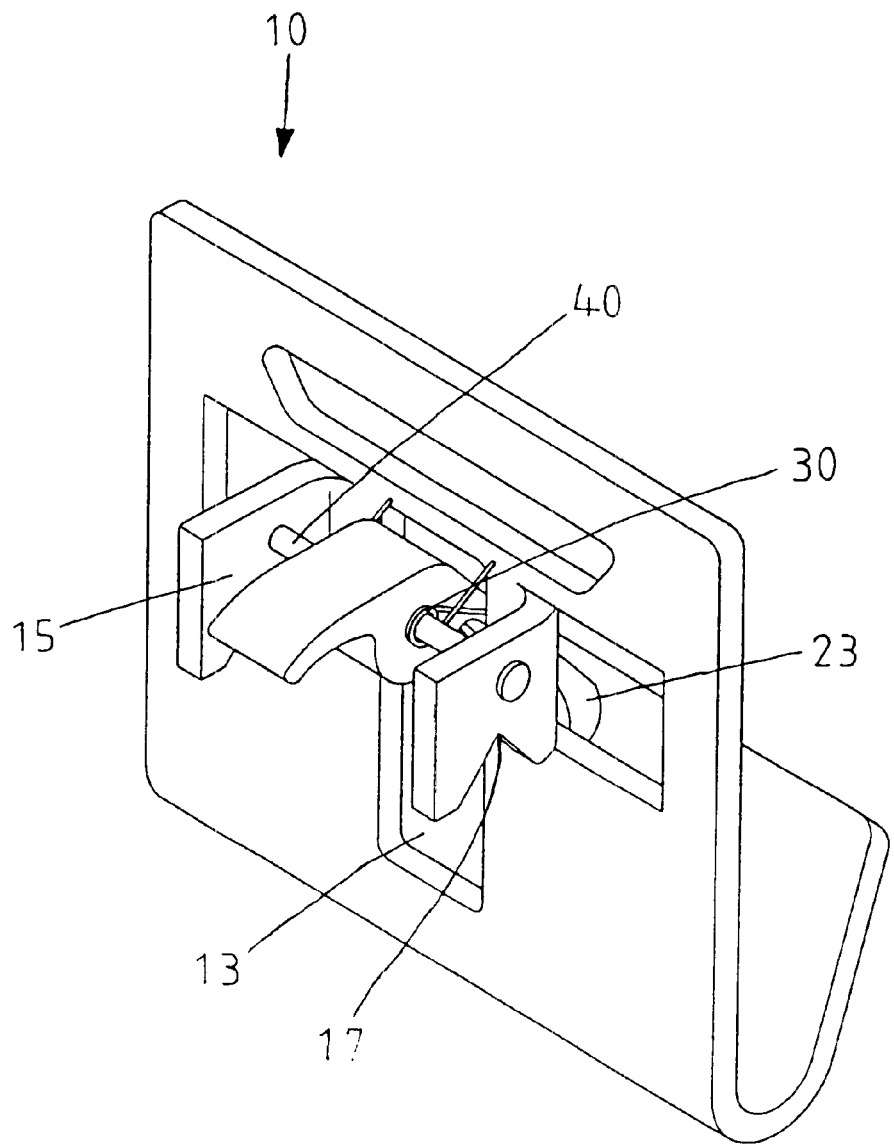
FIG. 2 is a front perspective assembly view of the positioning device of a freight rope fixture in accordance with the preferred embodiment of the present invention.

Referring to the drawings and initially to FIGS. 1–4, a positioning device of a freight rope fixture in accordance with a preferred embodiment of the present invention comprises a metallic plate 10, an urging seat 20, a torsion spring 30, and an insertion pin 40.

The metallic plate 10 is integrally formed with a bent hook portion 11 by a punching process. The metallic plate 10 has two sides formed with two opposite rectangular slots 12. The metallic plate 10 is integrally formed with two opposite wings 15 through the two opposite rectangular slots 12 by a punching process. Each of the two opposite wings 15 of the metallic plate 10 is formed with a through hole 16, and has a lower edge formed with a substantially triangular locking portion 17. The metallic plate 10 has a mediate section formed with a rectangular retaining slot 13 located between the two opposite rectangular slots 12. The metallic plate 10 has an upper portion formed with an elongated fixing slot 14 located above the rectangular retaining slot 13.

The urging seat 20 is substantially V-shaped, and has a first end integrally formed with an urging portion 23, and a second end integrally formed with a press portion 24. The urging seat 20 is pivotally mounted between the two opposite wings 15 of the metallic plate 10, and has a mediate section formed with a protruding portion 21 which is formed with a through hole 22 for passage of the insertion pin 40.

The torsion spring 30 is mounted on the insertion pin 40, and is urged between the metallic plate 10 and the urging portion 23 of the urging seat 20.

The insertion pin 40 is in turn extended through the through hole 16 of each of the two opposite wings 15 of the metallic plate 10, the through hole 22 of the protruding portion 21 of the urging seat 20, and the torsion spring 30.

Figure 3:
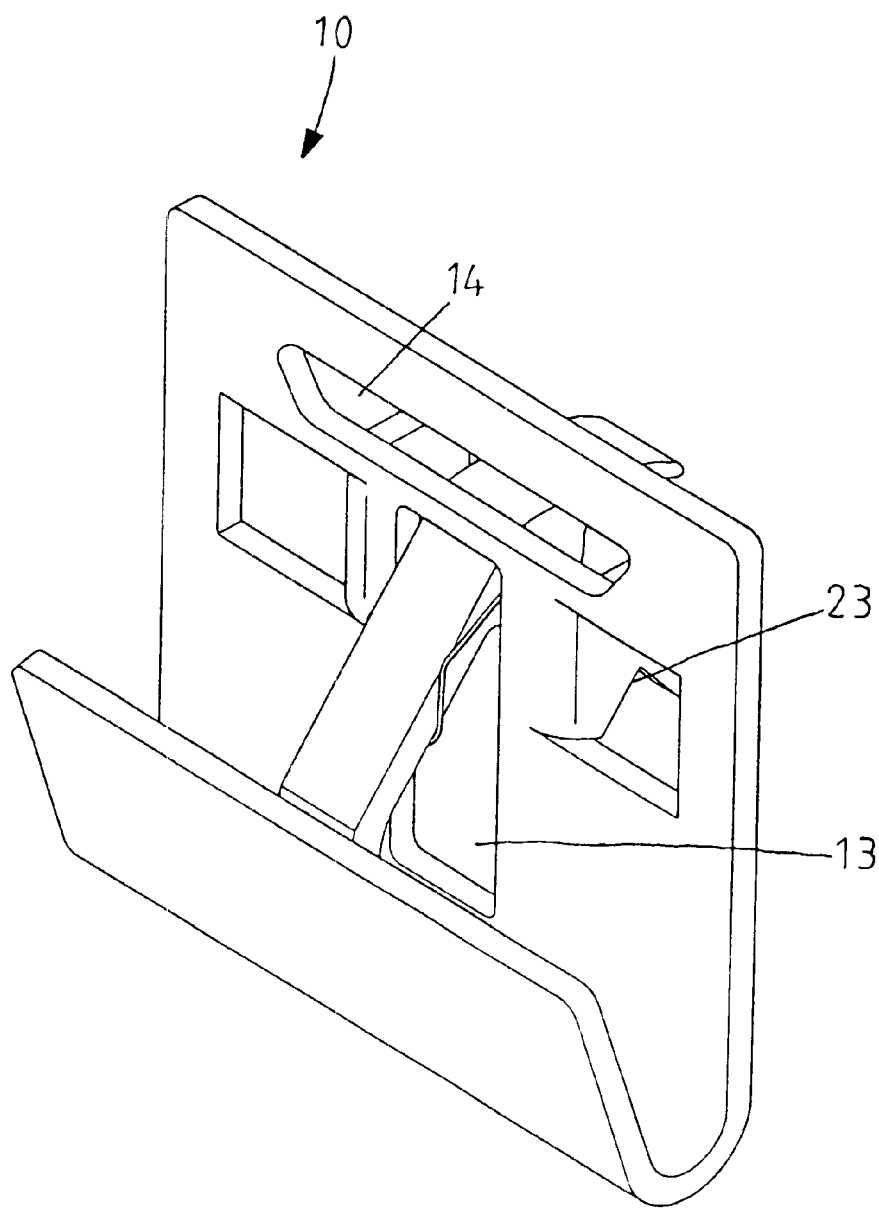
FIG. 3 is a rear perspective assembly view of the positioning device of a freight rope fixture in accordance with the preferred embodiment of the present invention.

Thus, the torsion spring 30 may force the urging portion 23 of the urging seat 20 to pass through the rectangular retaining slot 13 of the metallic plate 10 to rest on the bent hook portion 11 of the metallic plate 10 as shown in FIGS. 3 and 4.

As shown in FIGS. 1 and 4, the urging seat 20 and the torsion spring 30 are pivotally mounted between the two opposite wings 15 of the metallic plate 10, and the torsion spring 30 may force the urging portion 23 of the urging seat 20 to pass through the rectangular retaining slot 13 of the metallic plate 10 to rest on the bent hook portion 11 of the metallic plate 10. Thus, the urging portion 23 of the urging seat 20 may produce an urging effect on the bent hook portion 11 of the metallic plate 10. The press portion 24 of the urging seat 20 may be pressed upward, so that the urging seat 20 may be pivoted about the insertion pin 40, thereby moving and detaching the urging portion 23 of the urging seat 20 from the bent hook portion 11 of the metallic plate 10 easily and rapidly. When the pressing force applied on the press portion 24 of the urging seat 20 is removed, the urging seat 20 may be pivoted about the insertion pin 40 to return to its original position by the restoring force of the torsion spring 30, so that the urging portion 23 of the urging seat 20 may be rested and urged on the bent hook portion 11 of the metallic plate 10 again.

Figure 5:
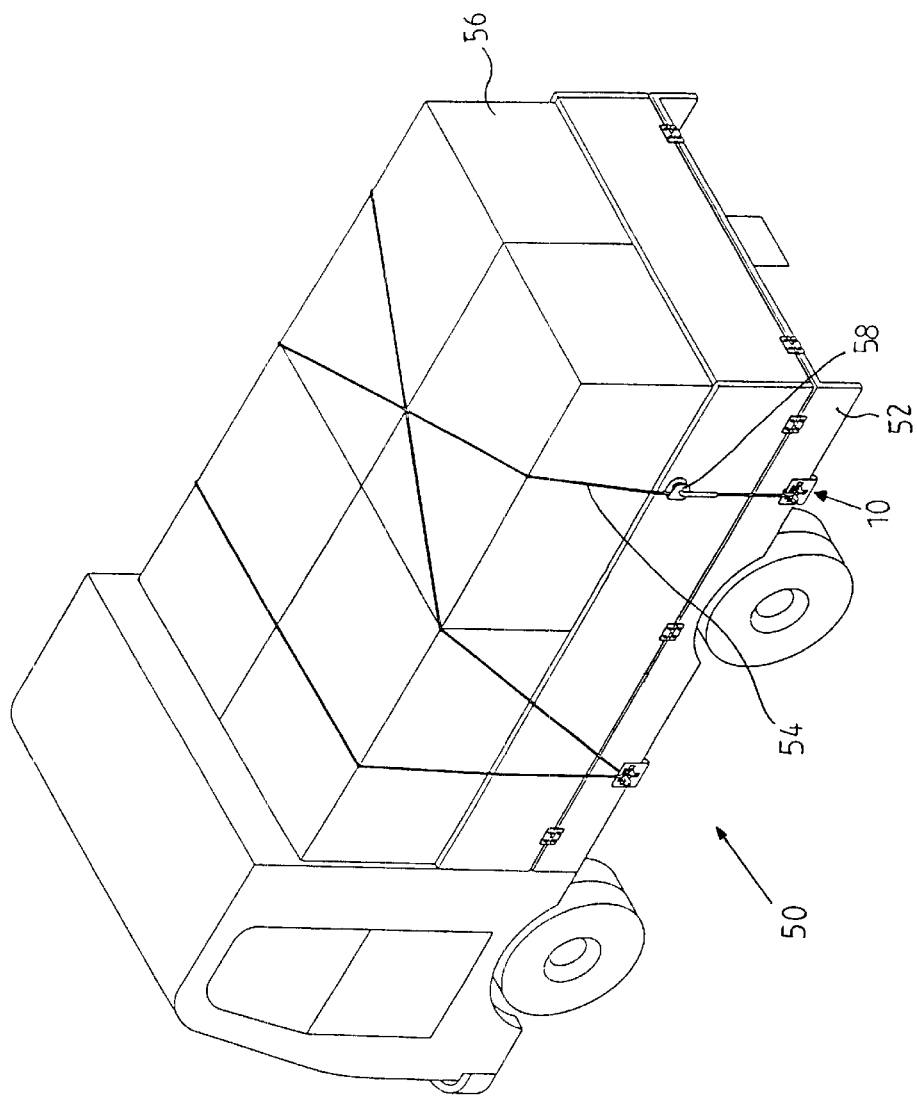
FIG. 5 is a schematic perspective view of the positioning device of a freight rope fixture in accordance with the preferred embodiment of the present invention.
Figure 6:
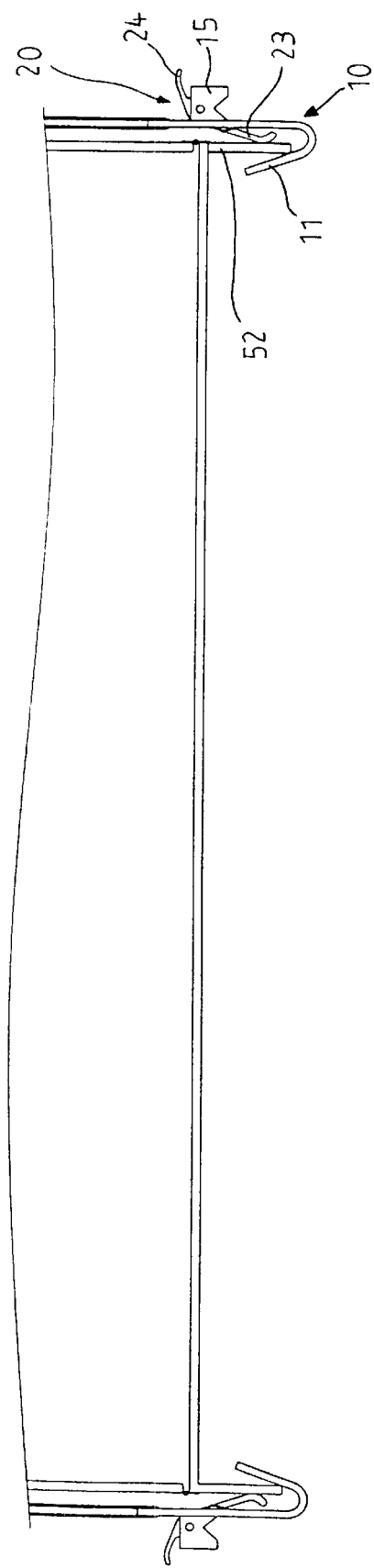
FIG. 6 is a schematic side plan view of the positioning device of a freight rope fixture in accordance with the preferred embodiment of the present invention.
Figure 7:
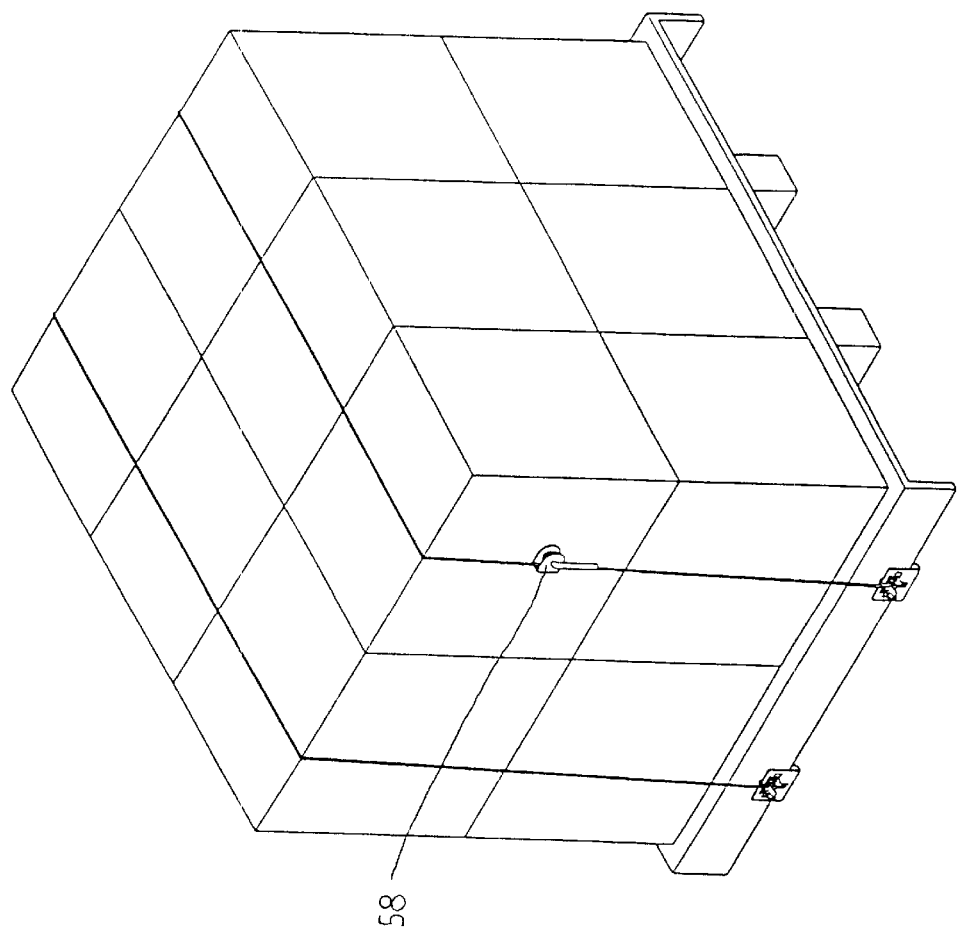
FIG. 7 is a schematic perspective view of the positioning device of a freight rope fixture in accordance with the preferred embodiment of the present invention.

Referring to FIGS. 5–7, the positioning device of the freight rope fixture in accordance with the present invention is initially hooked on the side plate 52 of a freight truck 50, wherein the torsion spring 30 may force the urging portion 23 of the urging seat 20 to rest on the side plate 52 of the freight truck 50, thereby achieving a previous locking and positioning effect, so that the rope 54 may be used to bind the freight 56 easily. In addition, an urging device 50 may be used to urge the rope 54, so that the freight 56 may be positioned rigidly and stably.

As shown in FIG. 8, the urging seat 20 is integrally formed with the urging portion 23.

As shown in FIG. 9, in accordance with another embodiment of the present invention, the urging seat 20A is integrally formed with the urging portion 23A which is integrally formed with multiple teeth 231.

Figure 10:
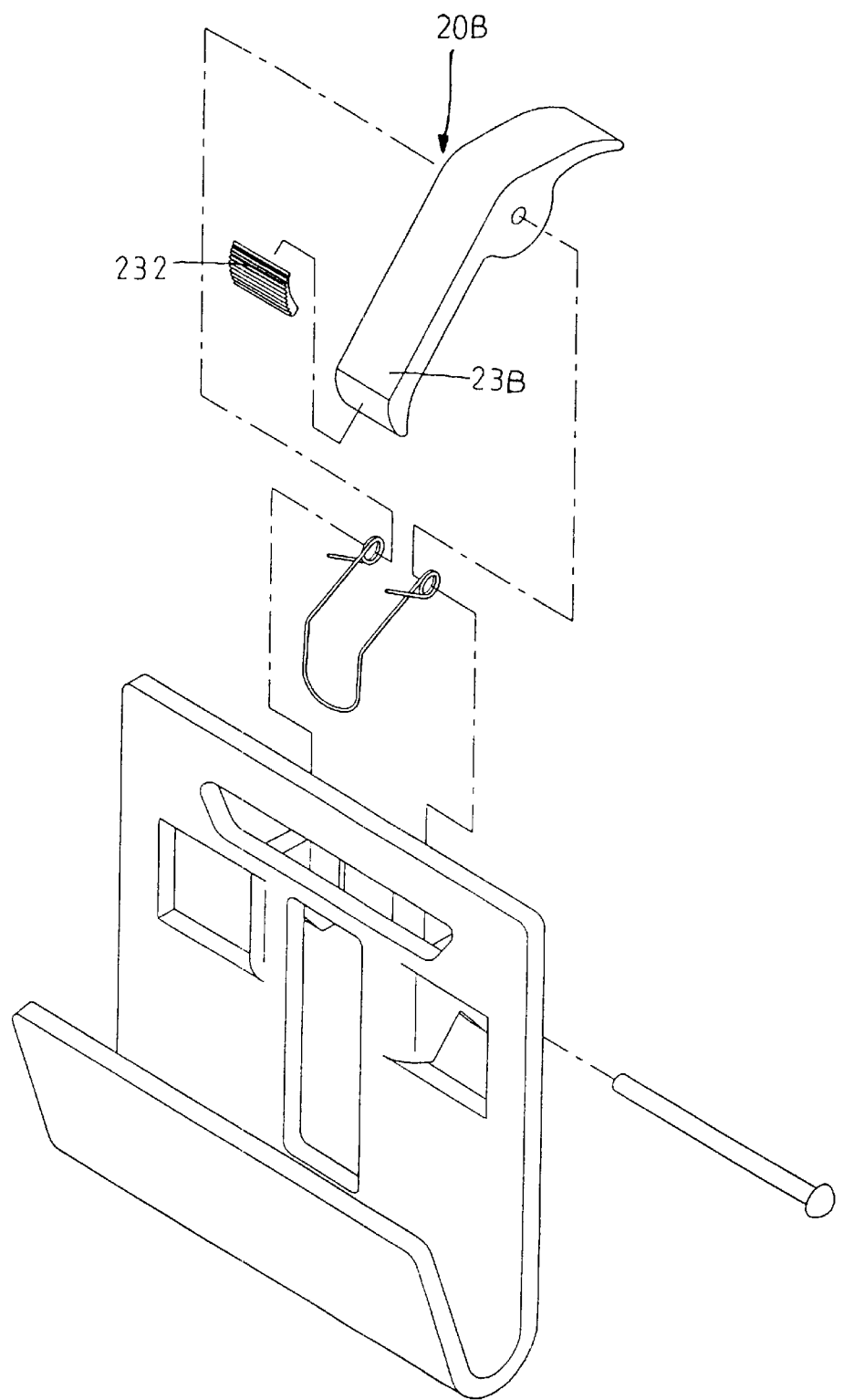
FIG. 10 is a perspective view of an urging seat of the positioning device of a freight rope fixture in accordance with another embodiment of the present invention.

As shown in FIG. 10, in accordance with another embodiment of the present invention, the urging seat 20B is integrally formed with the urging portion 23B, and a toothed soft pad 232 is bonded on the urging portion 23B of the urging seat 20B.

As shown in FIG. 11, the metallic plate 10 is integrally formed with the bent hook portion 11 by a punching process.

Figure 12:
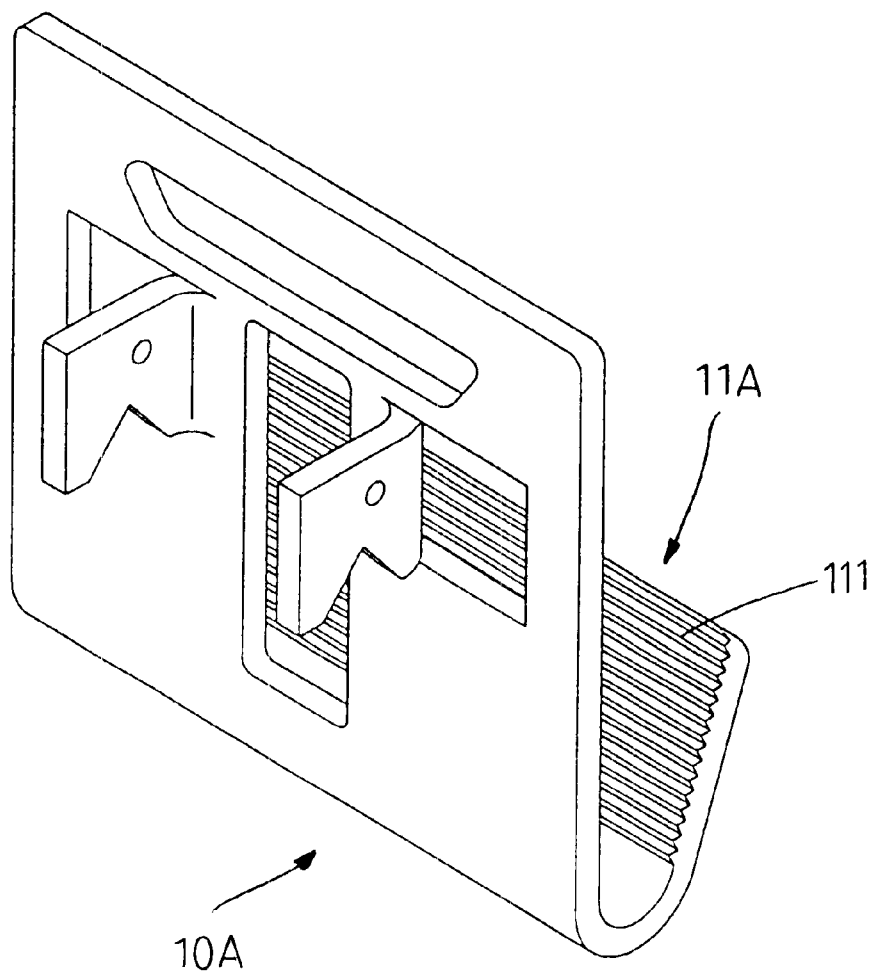
FIG. 12 is a perspective view of a metallic plate of the positioning device of a freight rope fixture in accordance with another embodiment of the present invention.

As shown in FIG. 12, in accordance with another embodiment of the present invention, the metallic plate 10A is integrally formed with the bent hook portion 11A by a punching process, and the bent hook portion 11A is integrally formed with multiple teeth 111.

As shown in FIG. 13, in accordance with another embodiment of the present invention, the metallic plate 10B is integrally formed with the bent hook portion 11B by a punching process, and a toothed soft pad 112 is bonded on the bent hook portion 11B of the metallic plate 10B.

Figure 14:
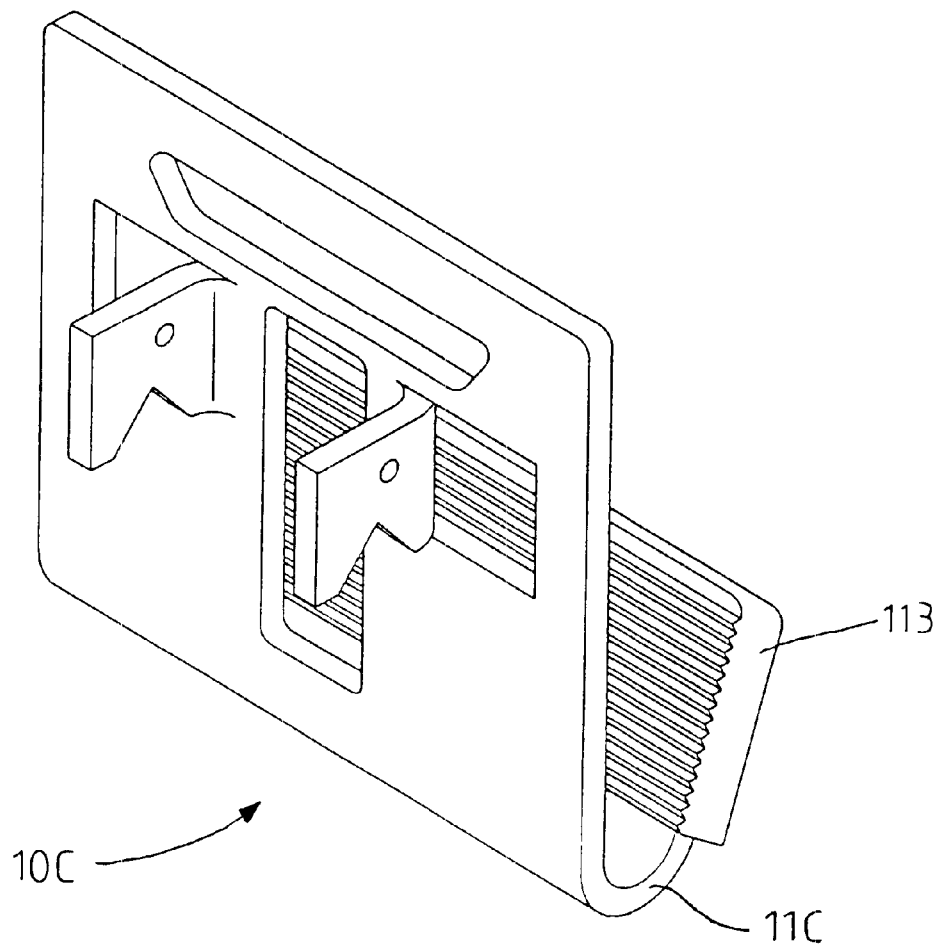
FIG. 14 is a perspective view of a metallic plate of the positioning device of a freight rope fixture in accordance with another embodiment of the present invention.

As shown in FIG. 14, in accordance with another embodiment of the present invention, the metallic plate 10C is integrally formed with the bent hook portion 11C by a punching process, and a toothed soft sleeve 113 is mounted on the bent hook portion 11C of the metallic plate 10C.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A positioning device of a freight rope fixture, comprising:

a metallic plate, an urging seat, a torsion spring, and an insertion pin, wherein:
the metallic plate is formed with a bent hook portion, the metallic plate has two sides formed with two opposite rectangular slots, the metallic plate is integrally formed with two opposite wings through the two opposite rectangular slots by a punching process, each of the two opposite wings of the metallic plate is formed with a through hole, the metallic plate has a mediate section formed with a rectangular retaining slot located between the two opposite rectangular slots;
the urging seat is pivotally mounted between the two opposite wings of the metallic plate and has a first end formed with an urging portion, and a second end formed with a press portion;
the torsion spring is urged between the metallic plate and the urging portion of the urging seat; and
the insertion pin is in turn extended through the through hole of each of the two opposite wings of the metallic plate, the urging seat, and the torsion spring.

2. The positioning device of a freight rope fixture in accordance with claim 1, wherein each of the two opposite wings of the metallic plate is formed with has a lower edge formed with a substantially triangular locking portion.

3. The positioning device of a freight rope fixture in accordance with claim 1, wherein the metallic plate has an upper portion formed with an elongated fixing slot located above the rectangular retaining slot.

4. The positioning device of a freight rope fixture in accordance with claim 1, wherein the urging seat is substantially V-shaped.

5. The positioning device of a freight rope fixture in accordance with claim 1, wherein the urging seat has a mediate section formed with a protruding portion which is formed with a through hole for passage of the insertion pin.

6. The positioning device of a freight rope fixture in accordance with claim 1, wherein the torsion spring forces the urging portion of the urging seat to pass through the rectangular retaining slot of the metallic plate to rest on the bent hook portion of the metallic plate.

7. The positioning device of a freight rope fixture in accordance with claim 1, wherein the urging seat is integrally formed with the urging portion.

8. The positioning device of a freight rope fixture in accordance with claim 1, wherein the urging seat is integrally formed with the urging portion which is integrally formed with multiple teeth.

9. The positioning device of a freight rope fixture in accordance with claim 1, wherein the urging seat is integrally formed with the urging portion, and a toothed soft pad is bonded on the urging portion of the urging seat.

10. The positioning device of a freight rope fixture in accordance with claim 1, wherein the metallic plate is integrally formed with the bent hook portion by a punching process.

11. The positioning device of a freight rope fixture in accordance with claim 1, wherein the metallic plate is integrally formed with the bent hook portion by a punching process, and the bent hook portion is integrally formed with multiple teeth.

12. The positioning device of a freight rope fixture in accordance with claim 1, wherein the metallic plate is integrally formed with the bent hook portion by a punching process, and a toothed soft pad is bonded on the bent hook portion of the metallic plate.

13. The positioning device of a freight rope fixture in accordance with claim 1, wherein the metallic plate is integrally formed with the bent hook portion by a punching process, and a toothed soft sleeve is mounted on the bent hook portion of the metallic plate.

* * * * *